United States Patent [19]

Leroy

[11] Patent Number: 4,560,531

[45] Date of Patent: Dec. 24, 1985

[54] DEVICE FOR PARTITIONING OFF THE CORE OF A NUCLEAR REACTOR

[75] Inventor: Jean-Luc Leroy, Gif-sur-Yvette, France

[73] Assignee: Framatome, Courbevoie, France

[21] Appl. No.: 265,486

[22] Filed: May 20, 1981

[30] Foreign Application Priority Data

Jun. 6, 1980 [FR] France .................. 80 12581

[51] Int. Cl.$^4$ .............................................. G21C 3/00
[52] U.S. Cl. .................................. 376/302; 376/285; 376/400
[58] Field of Search ............... 376/400, 390, 377, 462, 376/287, 302, 304, 285

[56] References Cited

U.S. PATENT DOCUMENTS

| | | | |
|---|---|---|---|
| 3,544,425 | 12/1970 | Shaw et al. | 376/383 X |
| 3,785,924 | 1/1974 | Notari | 376/400 X |
| 4,001,079 | 1/1977 | Rylatt | 376/285 X |
| 4,080,255 | 3/1978 | Rylatt | 376/400 X |
| 4,146,430 | 3/1979 | Berringer | 376/302 X |
| 4,158,605 | 6/1979 | Cooper et al. | 376/400 |
| 4,208,249 | 6/1980 | Jabsen | 376/285 |
| 4,462,956 | 7/1984 | Boiron et al. | 376/400 X |

FOREIGN PATENT DOCUMENTS

| | | |
|---|---|---|
| 2818886 | 4/1979 | Fed. Rep. of Germany . |
| 2484125 | 12/1981 | France .................. 376/302 |

Primary Examiner—Peter A. Nelson
Assistant Examiner—Daniel Wasil
Attorney, Agent, or Firm—Pollock, Vande Sande & Priddy

[57] ABSTRACT

A device for partitioning off the core of a nuclear reactor, including transverse plates (17) attached to the envelope (8) of the core and arranged transversely with respect to the fuel assemblies (5), and second plates (19) extending in the longitudinal direction with respect to the fuel assemblies. The second plates (19) are arranged in gaps between the transverse plates (17) and slightly stepped back with respect to the assemblies (5). The transverse plates (17) are connected to the longitudinally extending plates (19) with a certain clearance in the longitudinal direction. The transverse plates (17) are in contact with the assemblies (5) arranged at the periphery of the core by way of a portion of their peripheral surfaces.

3 Claims, 5 Drawing Figures

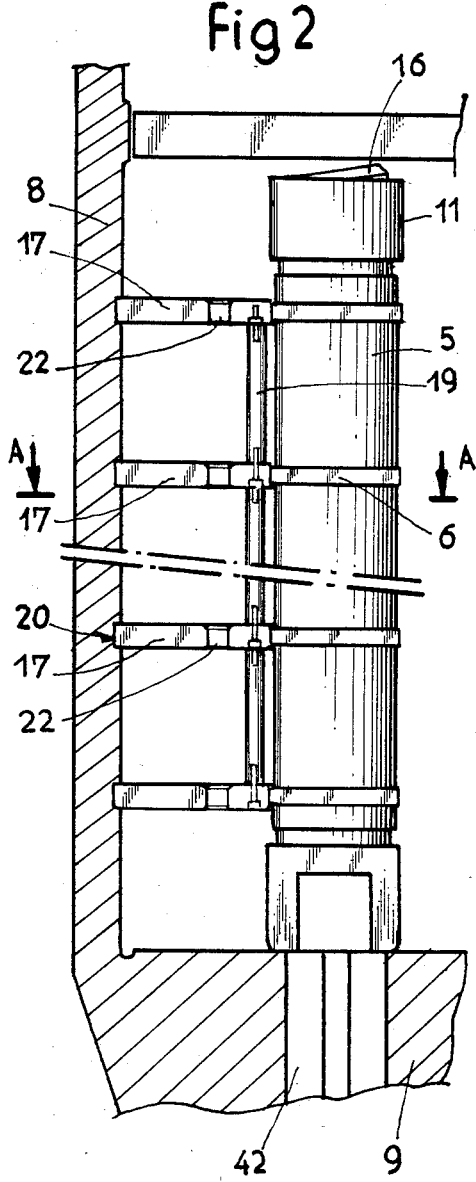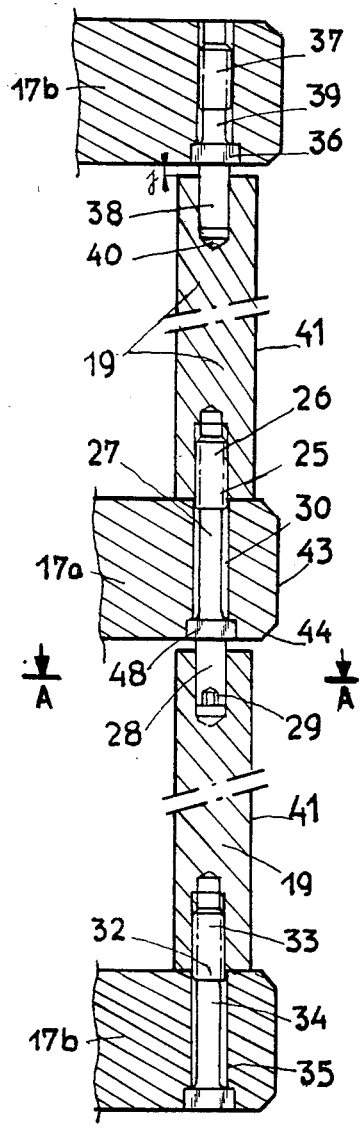

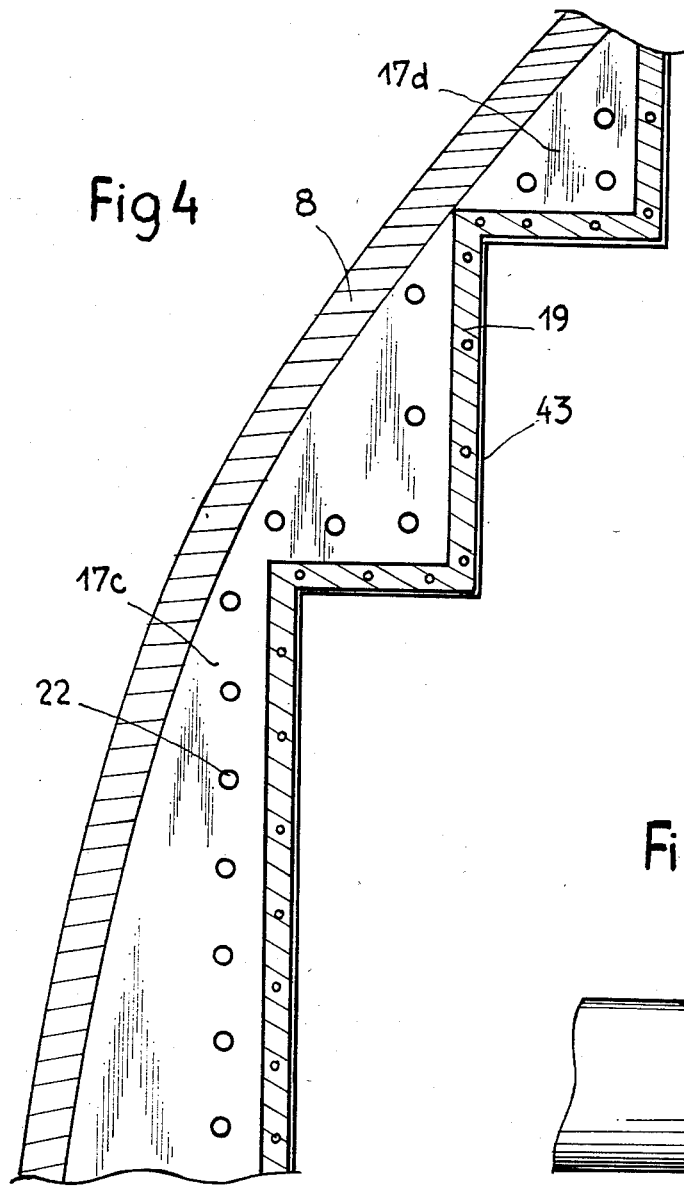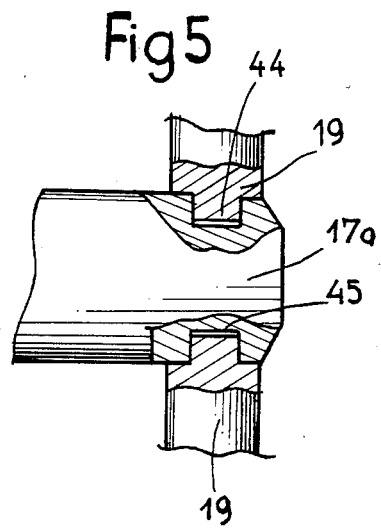

DEVICE FOR PARTITIONING OFF THE CORE OF A NUCLEAR REACTOR

FIELD OF THE INVENTION

The invention refers to a device for partitioning off the core of a nuclear reactor consisting of prismatic assemblies placed side by side inside an envelope which bounds at the sides a space surrounding the core in which a cooling liquid is flowing in the direction longitudinal to the assemblies.

BACKGROUND

In nuclear reactors, in particular in pressurized water nuclear reactors, the core of the reactor consisting of a set of prismatic assemblies, generally of square cross-section and arranged vertically, is traversed by a cooling liquid such as water under pressure, in the direction longitudinal to the assemblies, for cooling them and for the transfer of the heat of the core to the steam generators.

The fuel assemblies generally consist of a set of tubes enclosing the fissile matter, which are joined together in the form of a bundle thanks to retainer grids which are transverse with respect to the tubes forming the assembly.

The whole of the core is arranged in an enveloping skirt which is generally of cylindrical shape like the tank which contains the core and its auxiliary equipments immersed in the cooling liquid. This envelope must be separated from the assemblies of the core in order to diminish the injurious effects of irradiation upon the material of which it is formed. On the other hand, the set of assemblies forming the core exhibits a cross-section of irregular shape, including steps which are inscribed within the area of the enveloping skirt, with the result that there exists between the peripheral assemblies and the enveloping skirt an annular zone which is empty of fuel.

In order to preserve the initial geometry of the core and prevent the coolant from flowing freely in this zone and channel it over the core proper, the practice is known of employing a partitioning unit which exactly follows the contour of the core.

This partitioning unit is brought to a temperature close to that of the core with which it is in contact, whereas the cylindrical envelope of the core is at a substantially lower temperature.

That is, the cooling fluid, having given up a portion of its calories to the fluid which is to be evaporated in the steam generators and having been reintroduced into the reactor tank, flows in contact with the outer surface of the envelope of the core before coming into contact with the fuel assemblies forming the core. Hence this recycled fluid is at a distinctly lower temperature than the temperature of the core. The devices for partitioning off employed to date consist of plates in the longitudinal direction, the length of which is substantially equal to the height of the core and which are connected rigidly to the envelope of the core by way of transverse reinforcing plates called blenders, the latter being arranged at regular intervals in the direction longitudinal to the plates for partitioning off, in the space surrounding the core.

It is in fact necessary to connect the plates for partitioning off and the cylindrical envelope rigidly by elements of great strength, so as to enable the core to resist stresses such as those brought into play, for example, during earthquakes.

Such a structure must also be constructed with high dimensional accuracy in order to be perfectly adjusted to the dimensions and the shape of the unit forming the core of the reactor.

Hence thermal stresses caused by the difference in temperature between the envelope of the core and the plates for partitioning off arise in the structure for partitioning off, which is connected rigidly to the envelope of the core.

In addition, for the achievement of the structure for partitioning off, it is necessary to have available plates of very large dimensions, perfectly machined, and these plates are tricky to produce and of high cost.

SUMMARY OF THE INVENTION

The invention relates to a device for partitioning off the core of a nuclear reactor consisting of prismatic fuel assemblies placed side by side inside an envelope which bounds at the sides a space surrounding the core in which a cooling liquid is flowing in the direction longitudinal to the assemblies, the partitioning including plates attached to the envelope of the core, called blenders, arranged transversely with respect to the assemblies at regular intervals in the longitudinal direction in the space surrounding the core, and plates in the longitudinal direction, this device for partitioning off being of a simple construction employing longitudinal plates for which machine finishing is not necessary, and allowing differences in expansion between the envelope of the core and the partitioning.

For this purpose, the plates in the longitudinal direction are arranged in the gaps contrived between two successive blenders and slightly stepped back with respect to the assemblies with which they are not in contact, and these plates are connected to the blenders with a certain play in the longitudinal direction, the blenders bearing against the assemblies which are arranged at the periphery of the core, by way of a portion of their peripheral surface.

In order that the invention may be clearly understood, an embodiment will now be described by way of nonrestrictive example by referring to the accompanying drawings, of a device for partitioning off in accordance with the invention in the case of a pressurized-water nuclear reactor.

BRIEF DESCRIPTION OF THE DRAWINGS

FIG. 2 represents a more detailed view of one portion of the core of the reactor and of the device for partitioning off supporting the assemblies.

FIG. 3 represents an enlarged view of a portion of FIG. 2.

FIG. 4 represents a section along A—A in FIG. 3.

FIG. 5 represents in elevation and partial section a variant of the connection between the longitudinal plates and the blenders.

DETAILED DESCRIPTION

Figure 1:
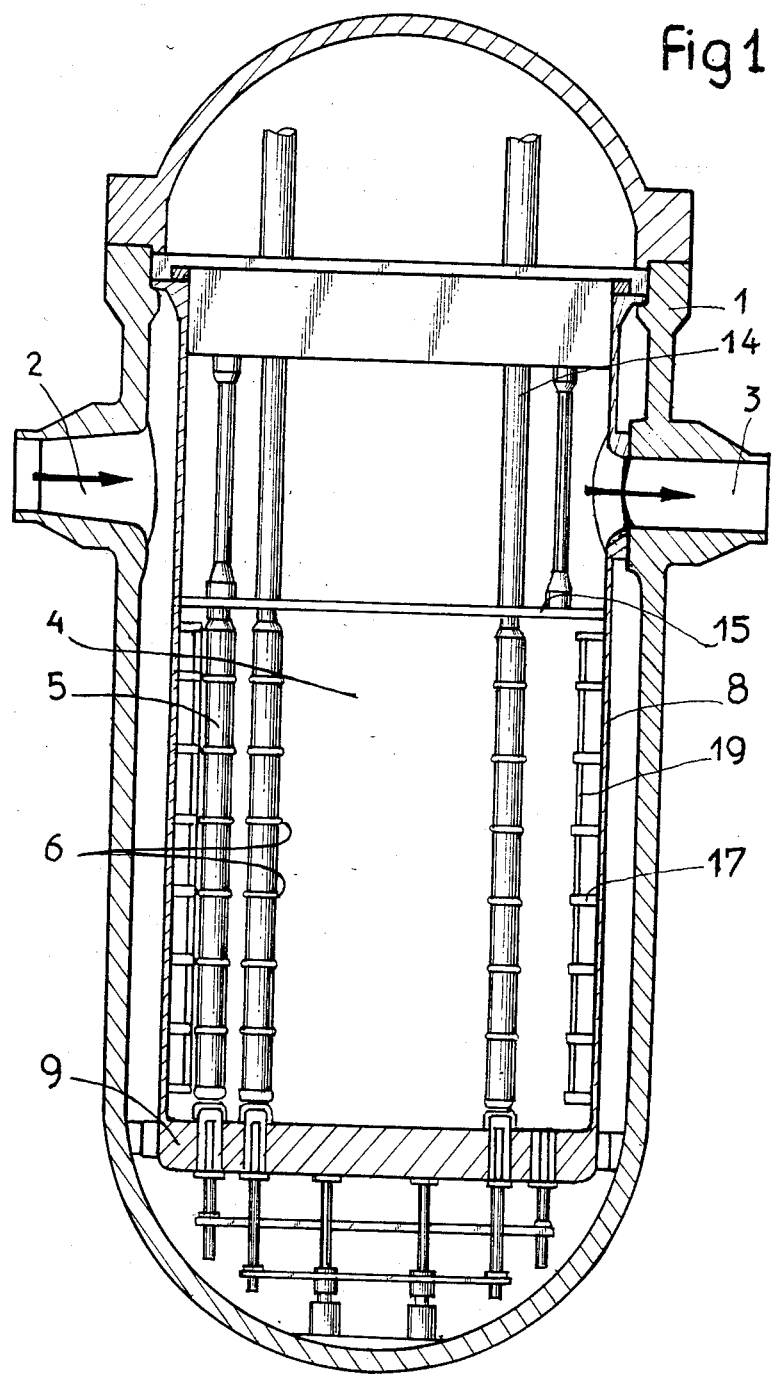
FIG. 1 represents a tank for a pressurized-water nuclear reactor, equipped with a device for partitioning off in accordance with the invention, in section through a vertical plane of symmetry.

In FIG. 1 the whole of the reactor has been represented diagrammatically, enclosed in a tank 1 equipped with pipe stubs 2 and 3, respectively, for the inlet and outlet of the primary coolant consisting of water under pressure which assures the cooling of the core 4 of the reactor in operation.

This core is composed of fuel assemblies 5 arranged vertically, each consisting of a set of pencils of fuel material supported laterally with respect to one another by grids 6 arranged at different levels.

The assemblies are of square section and are placed close together side by side. The whole is arranged inside a cylindrical envelope 8 which supports the whole of the core by way of a bottom support 9. The envelope of the core 8 is hung from the top flange of the tank, which provides the support of the whole of the core.

The inlet pipe stubs 2 for the cooling water into the reactor emerge into the tank 1 outside the core envelope 8. The outlet pipe stubs 3 open into the interior of this envelope 8. The circulation which is established in operation thus includes a path descending in the annular space between the tank 1 and the envelope 8, followed by a path rising through the bottom support 9 and the core 4, the bottom 9 being pierced with openings for the flow of the water under pressure.

In FIG. 1 there have also been shown as other conventional parts of a pressurized-water nuclear reactor, the upper internal equipments 14 which comprise the top core plate 15, the plates 9 and 15 serving as supporting plates for the assemblies of the core of the nuclear reactor.

The top plate 15 bears directly upon the assemblies by the weight of the upper internal equipment and the tightening of the cover of the tank. The core bottom plate and top plate are pierced with numerous holes for the centering of the fuel assemblies and for the flow of the cooling water.

In addition there appear very diagrammatically baffle plates 19 which extend in the direction longitudinal to the fuel assemblies, i.e., in the vertical direction between the blenders 17 which are integral with the core envelope 8.

Referring to FIG. 2, there may be seen more clearly the device for partitioning off at the level of the core of the reactor which is represented diagrammatically by a single fuel assembly 5 resting upon the bottom support 9 and held in place by the top core plate 15 bearing against springs 16 by way of which the pressure from the top supporting plate 15 is exerted.

Diagrammatically the device for partitioning off consists of plates 17 arranged horizontally, i.e. transversely with respect to the direction longitudinal to the assembly, and by longitudinal plates 19 arranged in each of the intervals between two plates 17 and connected to these plates 17.

The plates 17 called blenders are attached to the core envelope inside recesses 20, by screwing and welding.

The holes 22 passing through the blenders 17 allow the circulation of the cooling fluid in the vertical direction.

The assemblies 5 arranged at the periphery of the core butt by way of their bracer plates 6 against the blenders 17 the vertical spacing of which corresponds with the spacing between the bracer grids 6 of the assembly.

FIG. 3 shows the device for attachment of the vertical plates 19 to the blenders 17, each of the vertical plates 19 being arranged in a gap contrived between two blenders 17.

FIG. 3 shows a blender 17a which is arranged at any level depending upon the height of the assembly, and two blenders 17b arranged at the upper part and the lower part of the assembly, respectively, these blenders forming the end portions of the device for partitioning off.

It may be seen that the vertical plates 19 are connected to the blender 17a having an intermediate position, by a connector device 25 which includes a threaded upper portion 26, a middle portion 27 of small diameter and a lower portion 28 which includes a blind hole 29 of hexagonal section directed along the axis of the device 25, and an annular shoulder 48.

The blender 17a is pierced with a hole 30 which has two portions of different diameters separated by a shoulder against which the shoulder 48 on the device 25 comes to bear at the time of putting the partitioning in place.

The vertical plates 19 are connected to the blender 17a by screwing the threaded end 26 of the device 25 into a tapped hole cut in the lower portion of the plate 19 arranged above the blender 17a.

The screwing of the device 25 is effected by engaging a tool of hexagonal section in the blind hole 29. When the device 25 has been screwed home, the shoulder 48 has come to bear against the blender 17a.

The vertical plate 19 which lies below the blender 17a includes in its upper part a smooth blind hole of a diameter such that the plate 19 can engage over the lower portion 28 of the device 25.

Hence, each of the vertical plates 19 in a position intermediate between two blenders 17a and 17b is held against the blender 17a arranged at its lower end by screwing home connector 25. However a clearance j is maintained between the upper end of the vertical plate 19 and the lower portion of the blender 17b which is arranged thereabove.

On the other hand, when the plate 19 is placed between two blenders with its lower portion resting on the lower blender, the lower portion 28 of the fixing device 25 engaged in the blind hole 29 contrived in the plate 19 does not come into abutment against the bottom of this blind hole, a certain clearance being contrived. This permits plates 19 to expand freely in the vertical direction, i.e., in the direction longitudinal to the assemblies.

Relative displacement between the blenders 17 attached rigidly to the envelope 8 and the plates 19 forming part of the device for partitioning off may in fact occur by differential expansion between the envelope which is being swept externally by a fluid at a temperature relatively lower than that of the core, and the plates 19 and the ends of the blenders which are in contact with the periphery of the core.

FIG. 3 also shows a connector device 32 which enables the bottom blender 17b to be connected to the bottom vertical plate 19.

The device 32 includes a threaded upper portion 33 which is fixed into a tapped hole in the lower portion of the bottom vertical plate 19, and a lower portion 34 which engages in a hole 35 passing through the bottom blender 17b. The hole 35 includes two portions of different diameters separated by a shoulder against which is applied a shoulder between two portions of different diameters on the lower portion 34 of the device 32.

The connection between the top blender 17b and the vertical plate 19 arranged at the top portion of the partitioning is effected by way of a device 36 which includes a threaded upper portion 37 and a smooth lower portion 38 which includes a shoulder which comes to bear against a shoulder provided in the drilled hole 39 which passes through the blender 17b and includes a threaded portion for screwing in the portion 37 of the device 36.

The upper portion of the vertical plate 19 is drilled with a smooth hole 40 in which the lower portion 38 of the device 36 engages, though not down to the bottom of the hole, at the time plate 19 is put into position. Similarly, a clearance j is provided between the upper portion of this plate 19 and the lower portion of the top blender 17b. Thus, partitioning to deform at the time of differential expansions between the partitioning and the envelope 8.

The faces 41 of the plates 19 which are directed towards the core are stepped back with respect to the edges 43 of the blenders 17 which are directed towards the core and in contact with the bracer plates 6 of the assemblies 5 arranged at the periphery of the core.

In this way the faces 41 of the plates 19 do not come into contact with the assemblies 5 which are held solely by the portion 43 of the peripheral surface of the blenders 17.

These surfaces 43 are machined so as to include chamfers 44 which facilitate the putting in place and withdrawal of the assemblies 5 arranged at the periphery of the core of the reactor.

FIG. 4 shows that the blenders 17 have a shape such that their peripheral surface 43 directed towards the core forms a gap which corresponds exactly to the outer contour of this core.

The vertical plates 19 are arranged between each of the blenders a little stepped back with respect to the peripheral surface of the core so as to match the contour of the core round the whole periphery of the latter.

As in the prior art, the blenders arranged at a certain level in the core of the reactor are placed side by side and connected to the envelope 8 so that the whole of the blenders arranged at this level has a cross-section which corresponds with the cross-section of the annular gap formed between the core and the envelope 8.

Thus, FIG. 4 shows two blenders 17c and 17d which define one portion of this annular gap in which the water under pressure circulates by passing through the holes 22 contrived in the blenders 17. It will be obvious that other blenders arranged at the same level as the blenders 17c and 17d and not shown in FIG. 4 complete the assembly which defines the contour of the core.

FIG. 4 also shows seen the vertical plates 19 arranged stepped back with respect to the bearing faces 43 of the blenders which are stepped along a contour which reproduces the contour of the core.

FIG. 5 shows a variant connection between an intermediate blender 17a and two vertical plates 19. This connection is of the type having tenons 44 machined on the end portions of the plates 19 and mortices 45 machined in the upper and lower faces of the blender 17a. This assembly likewise enables differential expansion of the partitioning with respect to the core envelope 8.

The main advantages of the device in accordance with the invention are those of enabling easier mounting and machining of the partitioning by the employment of vertical plates of limited height arranged between two successive blenders and stepped back with respect to the periphery of the core.

The faces 41 of these plates 19 which never come into contact with the assemblies may be machined relatively roughly, thereby reducing the cost of manufacture. On the other hand, these plates allow differential expansion between the envelope and the partitioning because their mounting is carried out with a certain clearance in the direction longitudinal to the assemblies.

These clearances provided between the plates 19 and the blenders 17 also permit balancing of the pressures between the core and the gap arranged between the envelope and the core, in the case of accidental loss of coolant.

As in prior art devices, the plates 19 enable the cooling fluid to be channelled over the core, the fluid penetrating into the core through the holes 42 contrived in the support plate 9, as shown in FIG. 2.

Finally, the plates 19 likewise also play a part in the neutronic protection and against the gamma radiation of the tank of the reactor.

Other methods of connection may be conceived of between the vertical plates and the blenders and the invention is not restricted to the two embodiments which have been described.

One may conceive, for example, of fixing devices having springs between the plates 19 and the blenders' 17, which enable relative movements of the plates with respect to the blenders in the vertical direction.

One may equally well conceive that certain blenders are not situated opposite bracer grids.

Finally the invention is applicable not only to pressurized-water nuclear reactors, but equally well to any other type of reactor which includes a core consisting of prismatic fuel assemblies placed side by side inside an envelope which bounds at the sides a space surrounding the core in which a cooling fluid is circulating.

In particular the invention is not restricted to an embodiment in which the blenders are arranged horizontally and the plates in the longitudinal direction are arranged vertically.

I claim:

1. A device for partitioning off the core of a nuclear reactor having prismatic fuel assemblies arranged side by side at the periphery of said core inside an envelope which bounds at the sides a space surrounding the core in which a cooling liquid flows in the direction longitudinal to said fuel assemblies, said partitioning comprising
    (a) a plurality of first plates, called blenders, attached to said envelope fo said core, arranged transversely with respect to said assemblies at regular intervals in the longitudinal direction in said space surrounding said core, bearing against said fuel assemblies;
    (b) a plurality of second plates disposed in a longitudinal direction with respect to said fuel assemblies, arranged in gaps between two successive blenders, and slightly stepped back with respect to said assemblies and out of contact therewith, each of said second plates being in contact by one of its end portions with one of the blenders bounding the gap in which said second plate is arranged and is connected to the latter by screwing, while a certain play exists between the other end of said second plate and the other blender which bounds the gap in which said second plate is arranged, the latter being connected to said other blender by a smooth pin which engages in an opening at the corresponding end of said seond plate enabling free displacement of said second plate with respect to said other blender under the effect of thermal expansion under predetermined conditions of operation of said reactor.

2. A device according to claim 1 wherein said second plates are connected to said blenders by mortise joints.

3. A device according to claim 1, wherein the portion of the peripheral surface of said blenders which comes into contact with said assemblies includes chamfers in order to facilitate the emplacement and the withdrawal of said assemblies.

* * * * *